Figure 1:
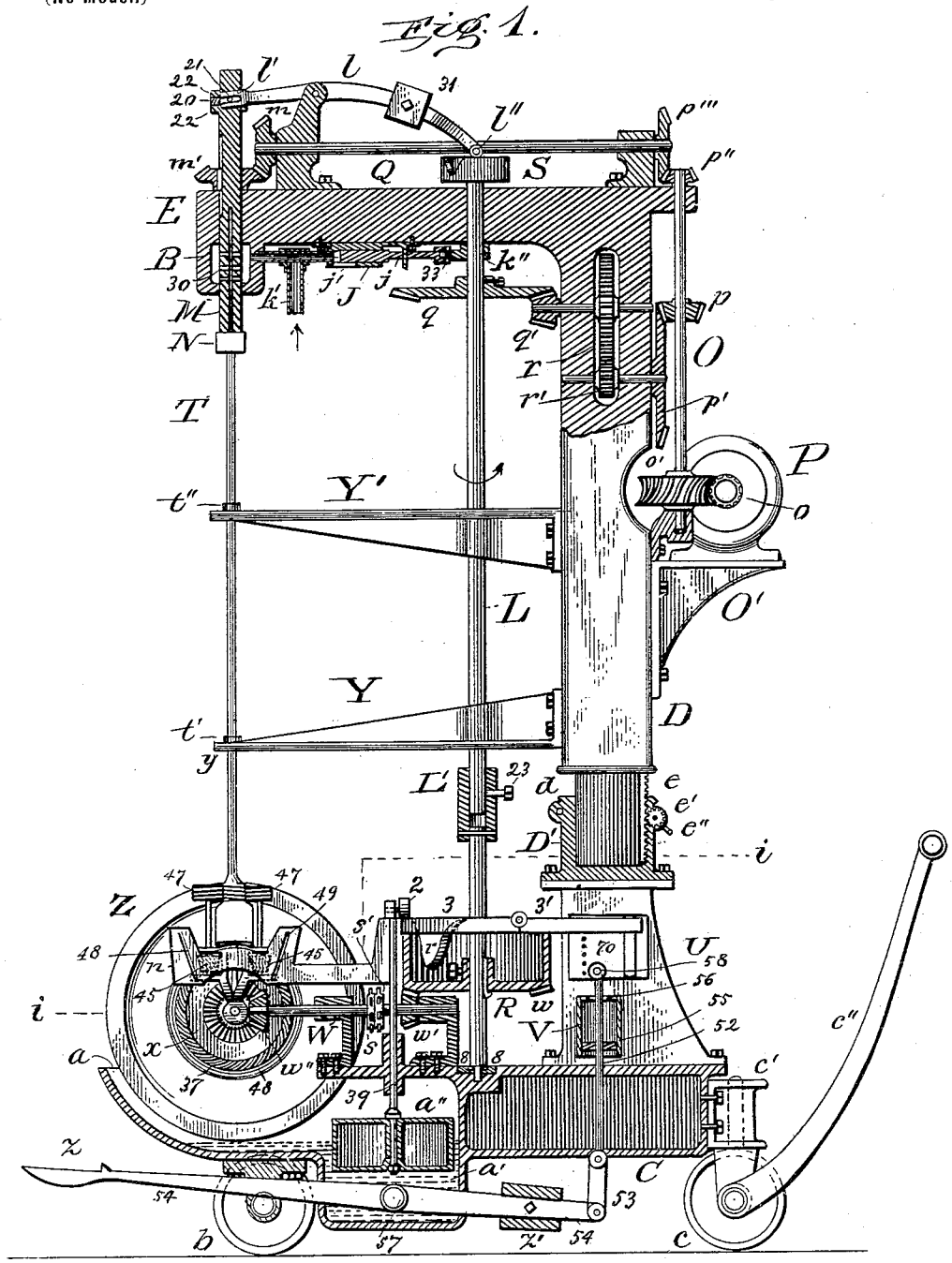

No. 620,568. Patented Mar. 7, 1899.
I. W. COLBURN.
GLASS WORKING MACHINE.
(Application filed Feb. 26, 1898.)
(No Model.) 4 Sheets—Sheet 3.

Witnesses:
J. M. Fowler Jr.
Walter B. Payne.

Inventor:
Irving W. Colburn
by Henry H. Bates
his Attorney

No. 620,568. Patented Mar. 7, 1899.
I. W. COLBURN.
GLASS WORKING MACHINE.
(Application filed Feb. 26, 1898.)
(No Model.) 4 Sheets—Sheet 4.
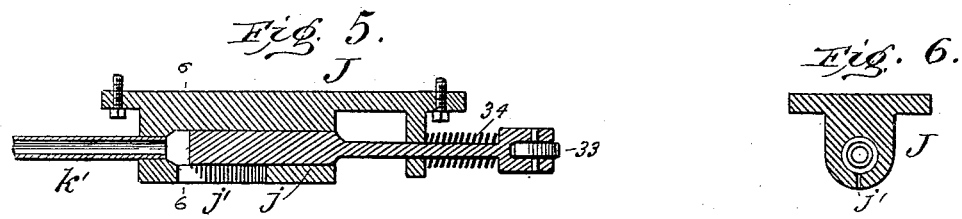
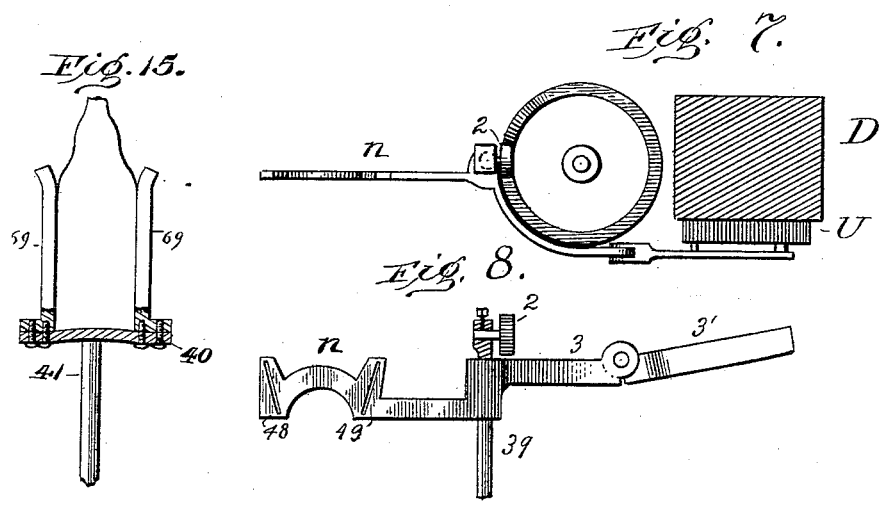
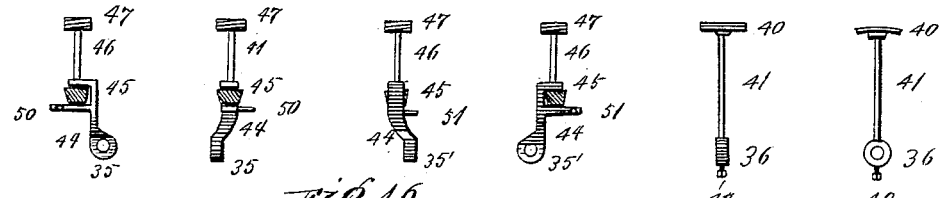
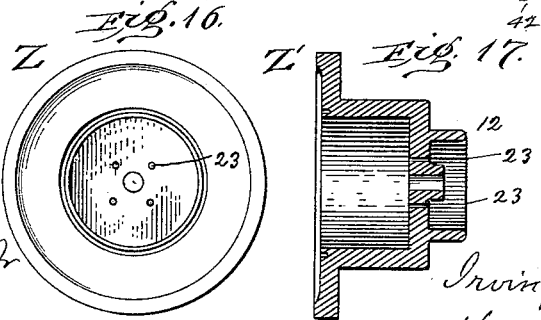
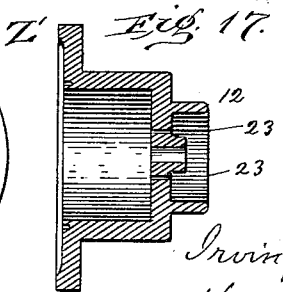
Witnesses:
J. M. Fowler Jr
Walter B. Payne.
Inventor
Irving W. Colburn
by Henry H. Bates
his Attorney

UNITED STATES PATENT OFFICE.

IRVING W. COLBURN, OF TOLEDO, OHIO.

GLASS-WORKING MACHINE.

SPECIFICATION forming part of Letters Patent No. 620,568, dated March 7, 1899.

Application filed February 26, 1898. Serial No. 671,799. (No model.)

*To all whom it may concern:*

Be it known that I, IRVING W. COLBURN, a citizen of the United States, residing at Toledo, in the county of Lucas and State of Ohio, have invented certain new and useful Improvements in Glass-Working Machines; and I do hereby declare the following to be a full, clear, and exact description of the invention, such as will enable others skilled in the art to which it appertains to make and use the same.

This invention relates to a novel means or apparatus for carrying into operation a new mechanical method of forming or manufacturing articles of glass, such as have heretofore been made by blowing in connection with sectional molds, either purely by manual process or in conjunction with machinery. By this method I dispense entirely with molds and form the article by means of rotating disks, one or more, revolving in contact with the hot plastic glass, in connection with other appliances, so that the operation is automatic.

This operation is a variation of another shown in an application pending concurrently with this, which I call "machine A," the present machine being B. In the present apparatus the disk formers make a number of revolutions before the operative cycle is completed, in which respect it differs from the former one. The disk former, as before, is formed, modeled, sculptured, or impressed on its working face with the form in intaglio of the object to be modeled in plastic glass, either in concentric channels or in the case of objects not round or cylindrical in contour the depressions of the formers are of suitable shape to give the required form to the glass article modeled by rolling contact therewith. In the case of round articles the contact need not be a rolling one, as the plastic glass can be modeled by a rubbing contact. This is also the case with some forms not round, as elliptical shapes and screw-threaded shapes.

In the drawings I have shown two disks facing each other as the preferred form in which to explain the invention. The mass of hot plastic glass is preferably supported rotatably between the said disks by means of a gathering-iron, usually tubular, and known to the trade as a "blow-iron," since it is the medium for introducing air within the expanding mass, either under pressure to force out the walls or passively to merely supply the cavity when centrifugal force alone is relied on to expand the walls of the glass object against the formers. The disks may be rotated either in opposite directions, as is preferable, or in the same direction with differential rates of speed, care being taken to properly support the plastic glass against dragging action. One form of such support is shown in Fig. 8, which shows fixed supports. Roller-supports can also be used in the same way. The plastic mass of glass may also be either positively rotated in the same direction or in the opposite direction to that of the moving surfaces in contact or it may be arranged to be passively rotated by frictional contact with the moving surfaces of the disks. The disks also may be arranged to passively rotate by frictional contact with the surface of the revolving mass of glass when the latter is positively rotated. It is not necessary that the axes of the revolving disks should be in alinement, although that is the preferable form. It is not even necessary that the axes should be parallel, as they can be inclined to each other by making the working faces of the disks conical.

When disks are used with axes out of alinement, but parallel, the contact with the plastic glass is not a rolling one, but a rubbing one, as, in fact, all disk contacts are in a degree, owing to the different velocities between the center and margin. In such cases only the simplest patterns can be used. When only a single disk former is used, as in some classes of work is desirable, some counter-support for the plastic glass should be used on the side opposite. This may be a roller-support or a stationary support, in either case made of the proper configuration. More than two disks may also be used in conjunction for forming articles relatively large.

In this machine the disks are constructed without an opening in the sides of the disk rolls, said machine being designed, as before said, so that in rolling glass the disks make a number of revolutions to one operation. This admits of a rapid rotation of the blow-iron and a fresh surface of roller-disks continually coming in contact with the article operated upon. In this machine it is possible to have the disks make similar speed with the glass article on the face of the same. In this way articles can be rolled without undue friction on sides of the glass, thus rolling difficult pieces and largely removing the difficulties with sectional paste-lined mold-machines, the friction causing a drag of glass in the molds and a consequent twisting and corresponding large breakage in mold-machines when articles of medium sizes are attempted. Large articles have not been possible to blow up to date with the mold-machines now in use.

The disks when machine is at rest are separated sufficiently to remove the finished product and to receive a fresh gathering of glass on the blow-iron. Immediately on starting the machine the disks approach each other until they come into contact with the plastic glass, which has commenced to expand by means of air-pressure or centrifugal pressure, or both. As the expansion continues the disks commence to separate slowly until the operation is complete. They then open to their fullest extent, separating from the article just operated upon.

This machine is also capable of forming certain-shaped articles by centrifugal force. When this is done, the gathering-iron, with its gathering of plastic glass, is rotated at a high rate of speed, the disks making a like high rate of speed. The speed of the glass on the gathering-iron and the disks increases gradually as the process continues and the article hardens until it has reached such a state of hardness that further expansion is not possible, at which time the operation is finished. This last-mentioned process is done entirely without the aid of any air-supply further than what is under atmospheric pressure and forced into the article by such pressure unaided. The production of articles by purely centrifugal force is somewhat limited, owing to the tendency of glass to expand rapidly, while in the state of extreme plasticity, to the greatest diameter of the rolled or formed article.

Figure 2:
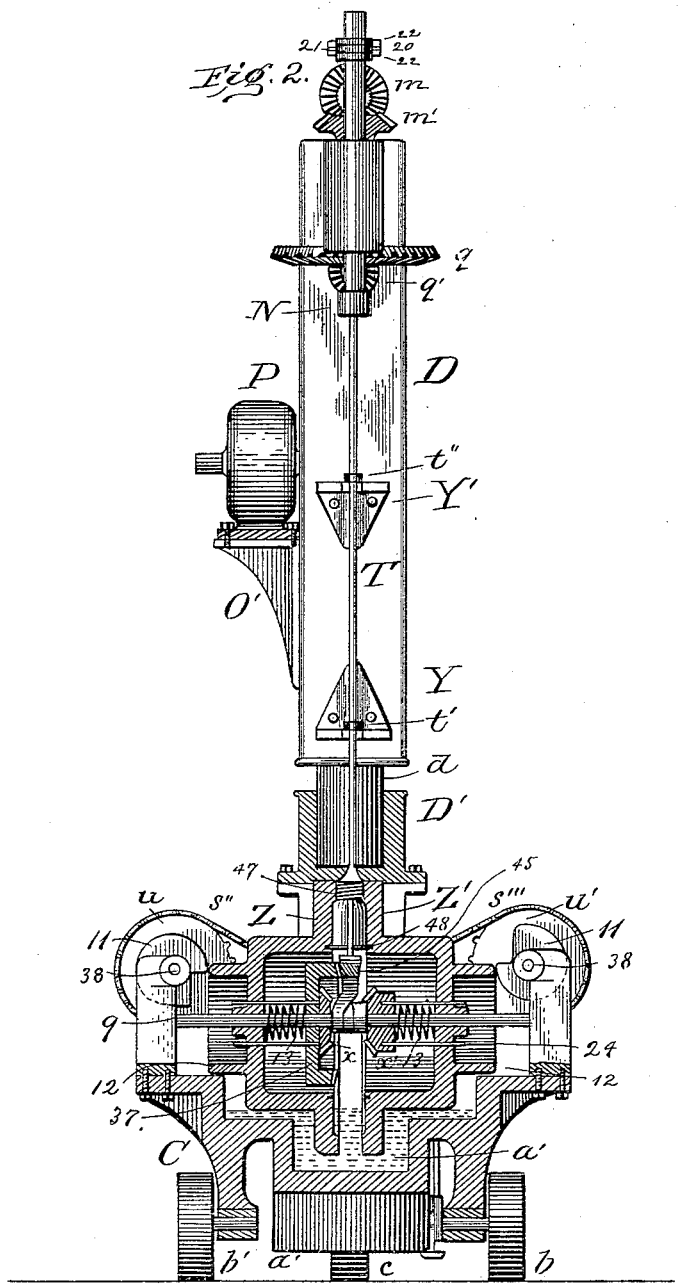
Figure 3:
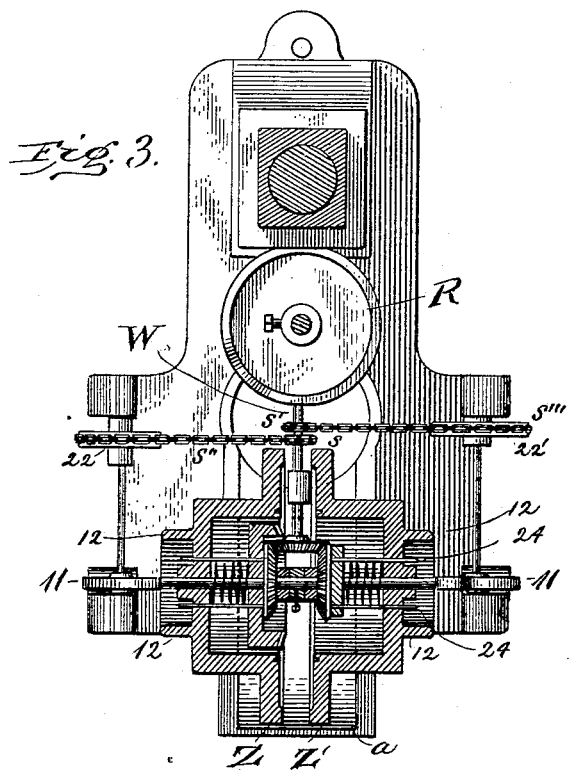
Figure 4:
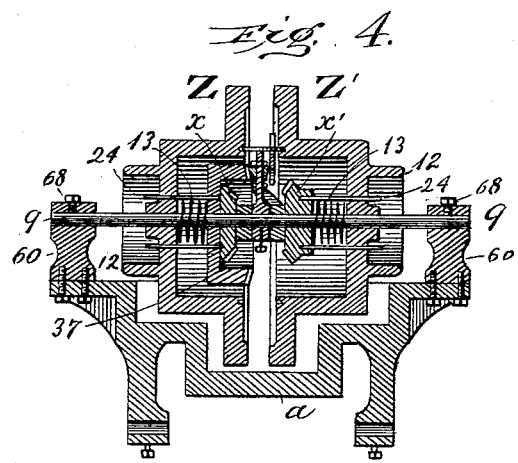

In the drawings forming a part of this specification, Figure 1 is a side elevation of the apparatus, partially in central section. Fig. 2 is a front elevation of the same, also partially in section, through the axis of the disk formers and through center of main-standard socket. Fig. 3 is a plan view, partially in section, through the axis of the disk formers on line $ii$ of Fig. 1. Fig. 4 is a vertical sectional view of the disk formers and their accessories through the axis. Fig. 5 is a longitudinal section of the air-pressure-regulating valve through the center. Fig. 6 is a transverse section of the same on line 6 6 of Fig. 5. Fig. 7 is a plan view of operating-cam R, showing lifting-cam and rheostat-arm, the main standard being in section. Fig. 8 is an elevation of the lifting-cam $n$ for operating upright screw-thread or spiral rollers with extended arm for operating rheostat. Figs. 9 to 12, inclusive, are front and side elevations of the screw-thread formers borne between the revolving disks. Figs. 13 and 14 are front and side elevations, respectively, of support for forming the bottoms of the plastic-glass articles. Fig. 15 shows such a support with fixed side supports, used when screw-threaded formers are not in use. Fig. 16 is a front elevation of roller-disk. Fig. 17 is a vertical section of roller-disk.

Like letters and numerals of reference refer to like parts on the several figures.

Referring to the drawings, C is the base of the machine, cored for lightness and containing water-tank $a$ with cylindrical depression $a'$.

The machine is mounted for convenience and portability on truck-rollers $b\ b'\ c$, of which roller $c$ is swiveled, as at $c'$.

D is an upright main standard borne on the base C and having an overhanging arm E for supporting the upper mechanism. Standard D is made extensible for adjustment to different species of work by means of cylindrical portion $d$, fitting into cylindrical cavity D' and carrying rack $e$, which can be adjusted up or down by means of pinion $e'$ and winch $e''$.

A clamp-screw, ratchet-bar with pawl, or other suitable means (not shown) is employed to keep the main standard in the required position.

Upon the main standard are bracket-arms Y Y' for supporting and steadying the rotary blow-iron.

O' is a bracket for sustaining the electric motor P when that source of power is used.

L is a main rotary shaft made extensible, like the main standard, by means of sleeve L' and clamp-screw 23. Said rotary shaft is supported on base C by ball-bearings 8 8. It carries a cam R, hereinafter described, a cam S, gear $q$, and cam $k''$, the latter keyed or clamped on the shaft by key. (Not shown.) Said main rotary shaft derives rotary motion from motor P through gears $q\ q'\ r\ r'\ p\ p'$, worm-wheel $o'$, and worm $o$, worm-wheel $o'$ and gear $p$ being on shaft O. Said shaft O also bears a gear $p''$ at its upper extremity, which conveys motion to other parts on overhanging arm E, presently to be described.

M is a vertical rotary hollow tube or air-spindle borne at the extremity of arm E. It derives rotary motion from prime motor P through gears $p''\ p'''$, shaft Q, and gears $m\ m'$, being splined where it passes through the latter gear to admit of longitudinal motion while rotating. This up-and-down motion is obtained from cam S in upper end of main rotary shaft L engaging with antifriction-roller $l''$ on weighted lever $l$, having fork $l'$ engaging with trunnions 21 on ring 20, the latter being rotarily held between collars 22 22 on rotary shaft M, so as to permit the rotation of the latter while the ring remains stationary. Said air-spindle passes through an air-box B on the extremity of arm E and has perforations 30 at intervals communicating with its hollowed interior, enabling it to take air while rotating. This air is supplied from an external source under pressure through pipe $k'$ by a flexible pipe or any suitable connection.

J is an air-regulating valve having piston $j$ and outlet-slit $j'$, through which air under pressure escapes in variable amounts by the action of piston $j$ as it plays back and forth, automatically governed by cam $k''$ on main rotary shaft L, against which the piston $j$ bears by means of antifriction-roll 33 and spring 34.

N is a clutch on the end of the air-spindle for engagement with the blow-iron, so as to rotate and supply air to the same.

T is the removable blow-iron, carrying the gathering of plastic glass on its lower end, having the usual enlargement $t'$ for taking seat in bracket-arm Y and a collar $t''$ for engagement with bracket-arm Y'.

Z Z' are disk formers inscribed on their faces with the proper configuration for molding the plastic glass in contact with which they rotate. These are rotatably mounted on fixed shaft 9, held by clamp-screws 68 and capable of both longitudinal and rotary motion thereon. Their rotary motion is derived from main rotary shaft L through gears $w$ $w'$, shaft W, gears $w''$ $x$ $x$, motion being conveyed from loose gears $x$ $x'$ by means of pins 24 24, attached to said gears and passing loosely through apertures 23 in the disk formers, thus allowing the latter to have longitudinal motion on shaft 9 while compelling them to turn with gears $x$ $x'$. Said gears $x$ $x'$ are kept a fixed distance apart by sleeves 35 35 36, which also have another function, presently to be described. Turning also with gear $x$ is gear 37, with a function presently to be described.

Between the disk formers Z Z' and gears $x$ $x'$ are the springs 13 13, which hold the said gears to their work, while tending to separate the disk formers, except as pressed to their work, by means now to be described. Said disk formers have at their rear the circular edge flanges 24, which run in contact with rotary cams 11 11. These latter are mounted on shafts 38 38, actuated by sprocket-wheels $u$ $u'$ and sprocket-chains $s''$ $s'''$, passing over sprocket-wheels $s$ $s'$ on shaft W', which receives rotary motion from main rotary shaft L through gears $w$ $w'$. These cams 11 11 automatically govern the distance apart of the disk formers in accordance with the law of formation of the article being molded and are removable and interchangeable, as are also the disk formers and the gears governing their relative speed. The disk formers run at their lower portions in water in the tank $a$, which is periodically supplied to them by means presently to be described.

Cam R is a rotary cam borne on rotary main shaft L. It bears bevel-gear $w$ on its under side, meshing with gear $w'$. On its edge runs an antifriction-roller 2, attached to shaft 39, which bears on its lower end a plunger or dasher $a''$. This dasher at periodic times, governed by the formation of the cam R, is plunged into the cistern $a'$, forming a part of tank $a$, and thereby raises the level of the water in the tank, so that it reaches and submerges the disk formers to the required extent for the purpose of wetting and cooling them at the close of the operation. Shaft 39 also has another function in carrying cam $n$ and rheostat-arms 3 3', whose functions will presently be described.

Between the disk formers is mounted on fixed shaft 9 a bottom slicker and support 40 on stem 41 by means of sleeve 36 and clamp-screw 32 or other suitable mode of attachment. The head 40 of this slicker-support runs in groove 48 of disk former Z to form a stop against the plastic glass. This head is free to revolve with the glass or is held stationary, as the case may demand, the stem being held fast to shaft 9 by clamp-screw 36. The top of the slicker-support is made of the reverse shape desired to be formed on the glass, and thus gives any desired shape to the bottom of the article. This slicker-support may carry upright fixed arms 43, as shown in Fig. 15, for the purpose of steadying the rotating article of plastic glass when subjected to the high speed employed in this species of forming. When screw-threads are to be formed on the article, as on the necks of bottles and jars, I employ the device of which the details are shown in Figs. 9 to 12, inclusive. These rotary screw-thread formers are mounted on sleeves 35, with curved pedestals 44 44, so shaped as to be revolubly mounted on fixed shaft 9 on each side of slicker-pedestal 36, the three sleeves just filling the space between gears $x$ $x'$. Each pedestal 44 bears a rotary screw-threaded former 47 on stem 46, with scroll-pinion 45, all rotatably mounted, so as to be revolved by the revolution of scroll gear-wheel 37, which intermeshes with said pinions 45 and drives them, being itself driven by the gear $x$.

The scroll-pinions 47 are always in mesh with scroll-gear 37; but the pivoted pedestals 44 are arranged to oscillate on shaft 9 in order to separate and allow the article to be removed when the thread-rolling operation is completed. This is accomplished by means of double cam $n$. (Shown in Figs. 7 and 8.) Said cam is mounted on shaft 39, so as to rise and fall with the same at the proper times, as governed by cam R. This cam has diagonal slots 48 49, which engage with pins 50 51 on oscillating pedestals 44 44. When the cam is in elevated position, the slots engage the pins 50 51 at their most convergent points, as shown in Fig. 1, and the pedestals are consequently upright, with the screw-threaded formers in position for operating upon the bottle-neck. When cam $n$ is depressed by the running of roller 2 to the lowest position on cam R, the slots then engage the pins at their most divergent parts and the pedestals, with their screw-thread formers, are thrown apart, thus permitting the glass article to be removed. In place of the screw-threaded devices 47 I sometimes employ rotary auxiliary formers of other designs when screw-threads are not required. These may be upright rollers of various shapes, being capable of the same movements during operation as the formers above described. Said shaft 39 also carries the rheostat-arm 3, having rule-jointed extension 3'. This extension makes the electrical contact with the contact-points 70 of the resistance-circuits of the rheostat which controls the turning on or off of the electrical current supplying the armature of the motor, thereby governing the automatic control and stopping of the machine. The starting of the machine is effected by the operation through direct means.

$z$ is a treadle on a pivoted lever 54, weighted, as at $z'$, connected by link 53 to upright shaft 52. This shaft communicates with a retarder, which in this case is shown as an air dash-pot V, having retarding-piston 55 and perforations at some point, as 56, to allow of the gradual escape of air under pressure of the treadle. An inlet-valve for air is also supplied at some point in the usual manner. The function of this retarder is to cause the foot-former to be applied gradually, so as not to injure the machinery.

At the top of the shaft 52 is a horizontal pin 58, which engages the extension 3' of arm 3 when the treadle is applied and gradually passes it across the contact-points 70, thus admitting the current by gradual steps to the armature of the motor. The weight $Z'$ returns the treadle $z$ and lever 54 and piston in the retarder to former position.

The stoppage of the machine, as well as the automatic control of the speed throughout the operation, is regulated by cam R and the movements of shaft 39, to which rheostat-arm 3 is attached. Only a slight movement of the treadle is necessary to effect the starting of this machine, since the moment enough current passes the rheostat to effect the rotation of main rotary shaft L the movements go on of themselves and become automatic.

Operation of machine: The machine as illustrated in the drawings is shown as about to finish the rolling of an article and about to come to rest automatically. I will first describe the different positions that the parts will be in when at rest ready for a fresh blow-iron with its gathering of plastic glass. The air-spindle M is now in contact with the blow-iron T. As soon as the main rotary shaft L turns slightly the cam S will have turned sufficiently to allow the roller $l''$ to drop to the lowest part of said cam, thus allowing the lever-arm $l$ to have taken a new position, this being aided by the weight 31 on said lever-arm, which is sufficiently heavy to at all times keep the roll $l''$ in contact with the cam S. This movement of the lever-arm has lifted the air-spindle M from off the blow-iron to its highest position. The slight turn of main rotary shaft L has in the meantime rotated cam R so as to permit roller 2 to descend on the incline of the cam to the lowest position at point $r$, carrying with it shaft 39. By this descent the following things are accomplished: First, as the shaft 39 descends it forces the heavy metallic dasher $a''$ into cistern $a'$, which is filled with water. This dasher or displacer being of a size but slightly smaller than its receptacle forces the water contained therein out of the cistern to a higher level in the tank $a$, thereby wetting and cooling the roller-disks and their roller-faces ready for a fresh operation. This same movement of the shaft 39 in its descent has carried with it the diagonal cam $n$, Fig. 8. This movement has, by means of the pins 50 51, Figs. 9, 10, 11, and 12, working in the diagonal slots 48 49, spread apart the spiral-faced rolls 47 47 sufficiently to admit of the taking out of the finished glass article from the machine. These supports 44 44 44 44 being fitted loosely to the fixed shaft 9 on their sleeves 35 35' are free to move in any position that the diagonal cam $n$ places them. This movement can be regulated in any desired manner to correspond with the condition of the plastic glass by interchangeable cams. The shaft 39 in its descent has, in carrying down the cam $n$, taken with it the rheostat-arm 3, with its rule-jointed extension 3'. In its passage down, this arm being of sufficient weight to remain in a horizontal position passes over the electrical contacts 70 on the rheostat U, thus gradually cutting off electric current from the motor-armature, and thereby stopping the same when it has reached its lowest position. By rotary motion of the cams $u$ $u'$, which make one revolution to an operation, the disks have been gradually separated until the article is completed, when they at once open to the fullest extent to allow of the disks being spread apart sufficiently to admit of the taking out of the finished product. It is at such a place that they are when the machine comes to rest.

Having described the positions of different parts of the machine when at rest ready for a fresh operation, I will now describe the operation of rolling or forming of a glass article. First, an attendant brings a blow-iron with a gathering of hot plastic glass, properly manipulated, upon its lower extremity and places it upright in its seat $y$ of bracket-arm Y, steadied by bracket-arm Y', where the usual clamps close upon and hold it. The attendant now presses treadle Z. This is prevented from too-rapid descent by retarder V. Immediately the pin 58 comes in contact with the extension-arm 3', rule-jointed to arm 3. This arm moves gradually across the electrical buttons 70 on rheostat U, thus admitting electric current to armature of the electric motor. This motor immediately starts, and with it all connecting machinery, through main rotary shaft L. The machine will now complete its own starting without further aid from outside. The cam R, beginning to revolve, raises roller 2 and its connecting-shaft 39. This in turn continues raising the rheostat-arm 3' across the electric buttons 70, admitting more current to the armature on the motor, thus increasing the speed as gradually as may be desired until the motor has attained its full speed. The movement of the motor in causing the main rotary shaft L to revolve has moved the cam S and caused roller l'' to lift from its lowest position, thereby raising weighted lever l and depressing the air-spindle M already in rotation. Said air-spindle immediately makes contact with blow-iron T and begins to take air through air-box B. The air-pressure is at first gentle, being regulated by valve J. Air comes from a constant source of supply and pressure through pipe k', but it finds two passages of escape, one through air-box B and the other through valve J. This latter has a variable outlet through slit j', the degree of opening of which is varied by the piston j by means of cam k'' on rotary shaft L. At starting, this cam is in position to give free exit to the air through the valve, and thus supplies but a minimum of pressure to the air-spindle; but as the operation goes on the regulating-valve modifies the discharge of air through slit j' in accordance with the law of formation of the cam k'', and thus applies the air-blast in regulated degree to the plastic glass under treatment. Cam k'' may also be arranged so as to give puffs of air as may be required in forming certain articles. Different-shaped cams are designed to be provided for this air-regulator to accommodate different requirements in glass-working. The movement of the shaft 39 has raised the diagonal cam-slits 48 49 of cam n, thus bringing the rollers for rolling spirals upon the plastic glass against the article. By proper shape being given to these diagonal cams the said spiral rollers can be made to approach the plastic glass until they are in contact with the same and then to open with the expanding glass. The raising of the shaft 39 has also raised the ducker a'', thus allowing water to recede from the receptacle a into cistern a' until the roller-disks are free from contact with the water. Motion having been given to the cam R and the bevel-gears w and w', the same is communicated to the shaft W, thence to gears w'' and x x', and thence through pins 24 24 24 24 to roller-disks Z Z'. It has also communicated power through the scroll bevel-gear 37 to the two scroll bevel-pinions 45 45, giving rotation to the spiral or screw-threaded rollers 47 47. Motion has also been transmitted from shaft W through double sprockets s s' and sprocket-chains s'' s''' to sprocket-wheels u and u' to shafts 38 38, and thence to cams 11 11, which make one revolution to an operation. Said cams 11 11 are designed to close the disk formers quite rapidly on the mass of glass at starting when its bulk is small, and thence allow the same to expand gradually under action of springs 13 13 to accompany the increasing volume of the article; but these cams are designed to be modified in form to suit each particular variety of article to be modeled and are exchangeable. After the machine is in full operation it will proceed until the cycle of operation is completed, when the machine stops automatically.

I claim and desire to secure by Letters Patent—

1. In a glass-working machine, revoluble disk formers for operating on plastic glass, one or more, supported so as to freely rotate, in combination with means for supporting a mass of plastic glass in moving contact therewith, and separate devices for operating on said plastic glass simultaneously, substantially as specified.

2. In a glass-working machine, a pair of revoluble disk formers for operating on plastic glass, in combination with means for supporting a mass of plastic glass in moving contact therewith, and means interposed between said formers for operating on the glass, substantially as specified.

3. In a glass-working machine, a pair of revoluble disk formers bearing patterns on their faces, means for rotating a mass of plastic glass in contact with the patterned faces of said disks, devices interposed between the disks for operating on said glass, and means for automatically approximating and separating said devices to and from said glass during the operation of forming, substantially as specified.

4. In a glass-working machine, a pair of revoluble disk formers, means for rotating the said formers, means for rotating a mass of plastic glass held between said formers, separate formers supported between said disk formers on each side of the rotatable mass of glass, means for approximating and separating said separate formers to and from said mass of glass, and means for approximating and separating said disk formers to and from the mass of plastic glass while rotating, substantially as specified.

5. In a glass-working machine, in combination, a pair of revoluble disk formers, means for rotating a mass of plastic glass in contact with the inner faces of said disks, devices interposed between said disks for operating simultaneously on said glass, means for approximating and separating said devices to and from said glass during the operation of forming, means for approximating and separating said disk formers to and from the said glass while forming, and means for automatically wetting said disk formers at the close of the operation, substantially as specified.

6. In a glass-working machine, revoluble disk formers with means for rotating the same, in combination with means for supporting a mass of plastic glass in moving contact therewith, and separate screw-threaded formers for forming screw-threads on the said glass while being operated on by said disk formers, substantially as specified.

7. In a glass-working machine, in combination, a removable gathering-iron, revoluble disk formers, movable and rotatable formers between the disk formers, and means for simultaneously rotating said gathering-iron, said disk formers, and said intermediate formers, substantially as specified.

8. In a glass-working machine, in combination, a removable blow-iron, revoluble disk formers, intermediate formers, means for supplying air to said blow-iron under variable pressure, and means for rotating said blow-iron, said disk formers, and said intermediate formers, substantially as specified.

9. In a glass-working machine, in combination, revoluble disk formers, a removable blow-iron, a revoluble air-spindle, means for automatically moving said air-spindle up and down while revolving, means for supplying air to said air-spindle under constant pressure while revolving, means for automatically varying said air-pressure, and means for periodically wetting said disk formers while revolving, substantially as specified.

10. In a glass-working machine, in combination, revoluble disk formers, intermediate formers supported on the central axis so as to expand and contract radially, a cam for expanding and contracting said formers, an upright shaft 39 for actuating said cam, a rotary cam for automatically operating said upright shaft, a tank, a depressed cistern in said tank, and a plunger $a''$ on said upright shaft, for displacing the water in said cistern and wetting said disk formers simultaneously with the expansion of said intermediate formers, substantially as specified.

11. In a glass-working machine, in combination, revoluble disk formers, intermediate rotary formers on radial oscillating standards, scroll-pinions on said intermediate rotary formers, a scroll-gear 37 intermeshing with said scroll-pinions, gears $x$ $x'$, rotary main shaft L, and intermediate mechanism for conveying motion from said main shaft L to said gears $x$ $x'$, and said disk formers and intermediate formers, substantially as specified.

12. In a glass-working machine, in combination, a rheostat, an electric motor, a rotary main shaft revolved by said motor, cam R on said rotary main shaft, upright shaft 37 with roller, controlled by cam R, diagonally-slotted cam $n$ on said upright shaft 37, rheostat-arm 3 with extension 3' on said upright shaft, plunger $a''$ on said main shaft, cistern $a'$ and tank $a$, substantially as specified.

13. In a glass-working machine, in combination, disk formers Z Z', gears $x$, $x'$, springs 13, pins 24, passing through apertures 23, flanges 12, cams 11, 11, sprocket-wheels $u$, $u'$, chains $s''$ $s'''$, sprocket-wheels $s$, $s'$, and gears $w$, $w'$, W, $w'''$, substantially as specified.

14. In a glass-working machine, in combination, a motor, a rheostat, a retarder, a treadle, an upright shaft 52 carrying pin 58, connected with said retarder and treadle, shaft 39, cam R, rule-jointed rheostat-arm 3, 3', diagonally-slotted cam $n$, revoluble disk formers Z Z' and rotary and oscillatory intermediate formers 47, substantially as specified.

15. In a glass-working machine, revoluble disk formers, means for revolving a mass of plastic glass in contact with said formers, a bottom support for said glass, and side supports attached to said bottom support for steadying said rotating glass, substantially as specified.

16. In a glass-working machine, a pair of revoluble disk formers on a common fixed axis, means for rotating said formers, means for rotating a mass of plastic glass between said formers, a bottom support and slicker for said rotating glass sustained upon said fixed axis between the disks, revoluble auxiliary formers sustained on said fixed axis on each side of said fixed support and capable of angular movement thereon, means for rotating said auxiliary formers each on its own axis, and means for oscillating said auxiliary formers angularly while rotating, substantially as specified.

17. In a glass-working machine, revoluble disk formers having patterned faces, a receptacle for water beneath said disk formers, a depressed cistern in said receptacle, means for rotating a mass of plastic glass in contact with said disk formers, means for automatically stopping the rotation of said disk formers and said mass of glass simultaneously, a plunger held over said cistern, and means for automatically depressing and lifting said plunger into and out of said cistern, whereby the water-level is raised in contact with said disk formers as they come to rest, and lowered when they start into action, substantially as specified.

18. In a glass-working machine in combination, a pair of revoluble disk formers, auxiliary formers mounted between said disks, on a central fixed shaft on oscillating standards so as to have angular motion thereon, means for rotating said auxiliary formers, each on its own axis, and a cam $n$ having diagonal slots 48, 49, engaging with pins 50, 51 on the said oscillating standards, whereby the latter are caused to expand and contract angularly as the said cam $n$ is automatically lowered and raised, substantially as specified.

19. In a glass-working machine, in combination a pair of revoluble disk formers mounted on a fixed shaft, a slicker-support mounted on said fixed shaft centrally between said disk formers, a pair of auxiliary formers mounted revolubly on oscillating standards on said fixed shaft on each side of the central slicker-support, means for oscillating said auxiliary formers and their standards, scroll-pinions on said auxiliary formers, and a scroll-gear, rotating in unison with one of said revoluble disk formers, engaging with the scroll-pinions on said auxiliary formers for rotating the latter simultaneously with the disk formers, substantially as specified.

20. In a glass-working machine, the automatic variable-pressure-regulating valve J, having sliding piston $j$, and air-slit $j'$, in combination with rotary cam $k''$, for automatically varying the escape-outlet and thereby regulating the volume of air delivered, substantially as specified.

21. In a glass-working machine, in combination, a blow-iron, a means for generating a blast of air, a conduit for delivering said air to said blow-iron, an escape-outlet connected with said conduit, and a positive means for automatically varying the aperture of said outlet, whereby the volume and pressure of air delivered to the blow-iron is positively regulated automatically, substantially as specified.

In testimony whereof I affix my signature in presence of two witnesses.

IRVING W. COLBURN.

Witnesses:
HENRY H. BATES,
ALEXANDER S. STEUART.